United States Patent [19]
Halford

[11] Patent Number: 5,128,810
[45] Date of Patent: Jul. 7, 1992

[54] SINGLE DISK EMULATION INTERFACE FOR AN ARRAY OF SYNCHRONOUS SPINDLE DISK DRIVES

[75] Inventor: Robert J. Halford, Chippewa Falls, Wis.

[73] Assignee: Cray Research, Inc., Eagan, Minn.

[21] Appl. No.: 727,282

[22] Filed: Jul. 3, 1991

Related U.S. Application Data

[63] Continuation of Ser. No. 227,367, Aug. 2, 1988, abandoned.

[51] Int. Cl.⁵ .............................................. G11B 5/09
[52] U.S. Cl. ................................. 360/39; 364/527.97; 364/939.4
[58] Field of Search ........................................ 360/39

[56] References Cited

U.S. PATENT DOCUMENTS

| | | | |
|---|---|---|---|
| 3,290,654 | 12/1966 | Rettig et al. | 364/200 |
| 3,955,180 | 5/1976 | Hirtle | 364/200 |
| 4,087,794 | 5/1978 | Beausoleil et al. | 364/200 |
| 4,322,793 | 3/1982 | Anderson et al. | 364/200 |
| 4,399,503 | 8/1983 | Hawley | 364/200 |
| 4,453,211 | 6/1984 | Askinazi et al. | 364/200 |
| 4,509,122 | 4/1985 | Agnew et al. | 364/200 |
| 4,511,963 | 4/1985 | Kantner | 364/200 |
| 4,607,328 | 8/1986 | Furukawa et al. | 364/200 |
| 4,642,759 | 2/1987 | Foster | 364/200 |
| 4,701,848 | 10/1987 | Clyde | 364/300 |
| 4,870,643 | 9/1990 | Bultman et al. | 360/98.01 |

FOREIGN PATENT DOCUMENTS

| | | |
|---|---|---|
| 0156724 | 10/1985 | European Pat. Off. |
| 0242121 | 10/1987 | European Pat. Off. |
| 0320107 | 6/1989 | European Pat. Off. |

OTHER PUBLICATIONS

Thinking Machines Corporation; Connection Machine Model Cm-2 Technical Summary; Apr., 1987; pp. 27-30.
Electronic Engineering Times, Jun. 6, 1988 pp. 73-74.
Ampex Scorpio Disk Storage Drive Models 48 and 80, Product description, Sep., 1981.
The Cray-2 Engineering Maintenance Manual, CMM 0200000, Dec. 1987; pp. 3-18 and 3-19.
Engineering Specification No. 3308829-01 to Ampex, Sep. 1976 and Sep. 1977.
Centaurus TM Parallel Transfer Disk Drives Series, from Data Systems Division of Ampex, May, 1985.
Centaurus TM Parallel Transfer Disk Subsystems, By Ampex Corp. (undated).
Centaurus TM Winchester Parallel Disk Drive, By Ampex Corp. Data Systems Divsion, © 1987.
"Exhibit 1A" Photograph of disk storage device of Thinking Machines, INc., Boston, MA.
Thinking Machines, Inc.; *IEE Computer*; Aug. 1988; pp. 26-38 Ampex Engineering Spec.; DF880/DF848 Banjo Fixed Disk Drives; Aug. 19, 1981.
Seagate Technology, Arrayed Disc Subsystem, Nov., 1988.

*Primary Examiner*—Vincent P. Canney
*Attorney, Agent, or Firm*—Merchant, Gould, Smith, Edell, Welter & Schmidt

[57] ABSTRACT

A multiple disk drive array storage device is described which emulates the operation of a single disk drive so that the handshaking and protocol between the array storage device and the host computer appears to the host computer to be that of a single disk drive. The array storage device includes a plurality of individual disk drives, each of which having its spindle synchronized to the other disk drives using a master clock synchronization. Digital data words are received by the array storage device controller which divides the words into subparts and writes each subpart to a different disk drive within the storage device. The buffering and formatting of the digital data for reading and writing from the individual disk drives is accomplished by the controller transparent to the host computer.

2 Claims, 5 Drawing Sheets

DAISY CHAIN CONFIGURATION

FIELD SECTOR FORMAT

FIG. 6

17 TRACK ERROR CORRECTION FOR ARRAY DISK DEVICE

- P = Odd Vertical Parity
- E = Longitudinal Group Code
- C = Longitudinal CRC Over Entire Sector

- P & E Used For Error Correction
- C Used To Verify Error Correction

SINGLE DISK EMULATION INTERFACE FOR AN ARRAY OF SYNCHRONOUS SPINDLE DISK DRIVES

This is a continuation, of application Ser. No. 07/227,367, filed Aug. 2, 1988, now abandoned.

BACKGROUND OF THE INVENTION

1. Field of the Invention

This invention relates generally to disk storage for computer systems. In particular, it is directed to an array of synchronous disk drives that emulate a single logical disk drive.

2. Description of the Prior Art

Disk drives have long been popular mass storage devices. They provide a low cost solution to the problem of non-volatile data storage. Virtually all computer system manufacturers, therefore, provide for disk drives as system peripherals.

The major advantage of disk drives is low cost. This advantage is outweighed for some applications by the disadvantage of insufficient data transfer speed, particularly in super computer and other high performance computing environments such as the type manufactured by Cray Research, Inc., the assignee of the present invention. The problems facing a computer system user wishing to increase the data transfer rates of disk drives are not trivial. Up until now, most solutions have sought to incrementally enhance the performance of a single disk drive while retaining the disk drive's basic architecture.

The basic structure of the disk drive consists of a metal disk coated with magnetic material rotating under one or more read/write heads. Most disk drives are multi-platen systems where a number of the metal disks are arranged in a stack.

All data transfers to disk drives are sequential in the sense that data moves in or out sequentially one word at a time. The access time to a selected word is partially dependent on its location. Data is recorded on the disk in concentric circles called "tracks". The disk drive has detection means for indicating when the magnetic head is positioned at the outermost track. A stepper motor (or servo-controlled linear motor) controls the head position causing it to step from track to track. This head positioning function is called a "seek". The period required to position the Read/Write heads from the time the command is received until the time the drive becomes ready is known as the seek time.

Once a track is selected, it is necessary to wait for the desired location to rotate into position under the head. The average waiting time, known as latency time, is the time for half a revolution.

Within each track, information is organized into segments called "sectors". A sector can consist of any number of bytes, limited only by the storage capacity of the track. The addressing of sectors is typically a software function. So that the sectors can be identified by the software, each sector is preceded by an identifier block. The format of this identifier block is system dependent.

Usually each track is single bit serial, so that each byte is stored as eight consecutive bits on a track. Because track selection and latency increase access times, it is preferable to transfer large blocks of data which will be stored in sequential locations. Once the disk heads are positioned at a particular track and no further head movement is required, data will be transferred at a fixed rate. This fixed rate is determined by the speed of the disk drive and is independent of the computer system itself.

Prior art disk drives are limited in their capacity and speed in transferring data. The prior art is lacking in high performance disk drives which will allow data transfer rates exceeding the speed of currently available disk drives. The prior art disk drives are also limited in their capacity to store data. There is a need in the art, therefore, for a higher capacity disk drive than that currently available.

SUMMARY OF THE INVENTION

To overcome the limitations in the prior art discussed above, and to overcome other limitations readily recognizable to those skilled in the prior art, this invention provides a new architecture for disk drive storage devices. According to the preferred embodiment of the present invention, a multiple disk drive array storage device is described in which a plurality of single disk drives are synchronized and controlled to emulate the operation of a single high-speed, high-capacity disk drive. The array storage device appears at the interface to the host computer to be a single disk drive. The array storage device synchronizes the spindles of a plurality of individual disk drives by means of a master clock (synchronizing) signal. Multibit digital data words are divided into subparts and each subpart is placed in a different fixed sector format block corresponding to each disk drive. Subparts from a plurality of words are assembled to form a single fixed sector format block, and when completed, each sector format block is written to an individual disk drive. In this fashion, the speed and capacity of the array storage device appears as a multiple of the number of individual disk drives internal to the device.

BRIEF DESCRIPTION OF THE DRAWINGS

In the drawings, where like numerals refer to like elements throughout the several views.

DETAILED DESCRIPTION OF A PREFERRED EMBODIMENT

In the following Detailed Description of the preferred embodiment, reference is made to the accompanying drawings which form a part hereof, and in which is shown by way of illustration a specific embodiment in which the invention may be practiced. This embodiment is described in sufficient detail to enable those skilled in the art to practice the invention, and it is to be understood that other embodiments may be utilized and that structural changes may be made without departing from the scope of the present invention. The following detailed description is, therefore, not to be taken in a limiting sense, and the scope of the present invention is defined by the appended claims.

Figure 1:
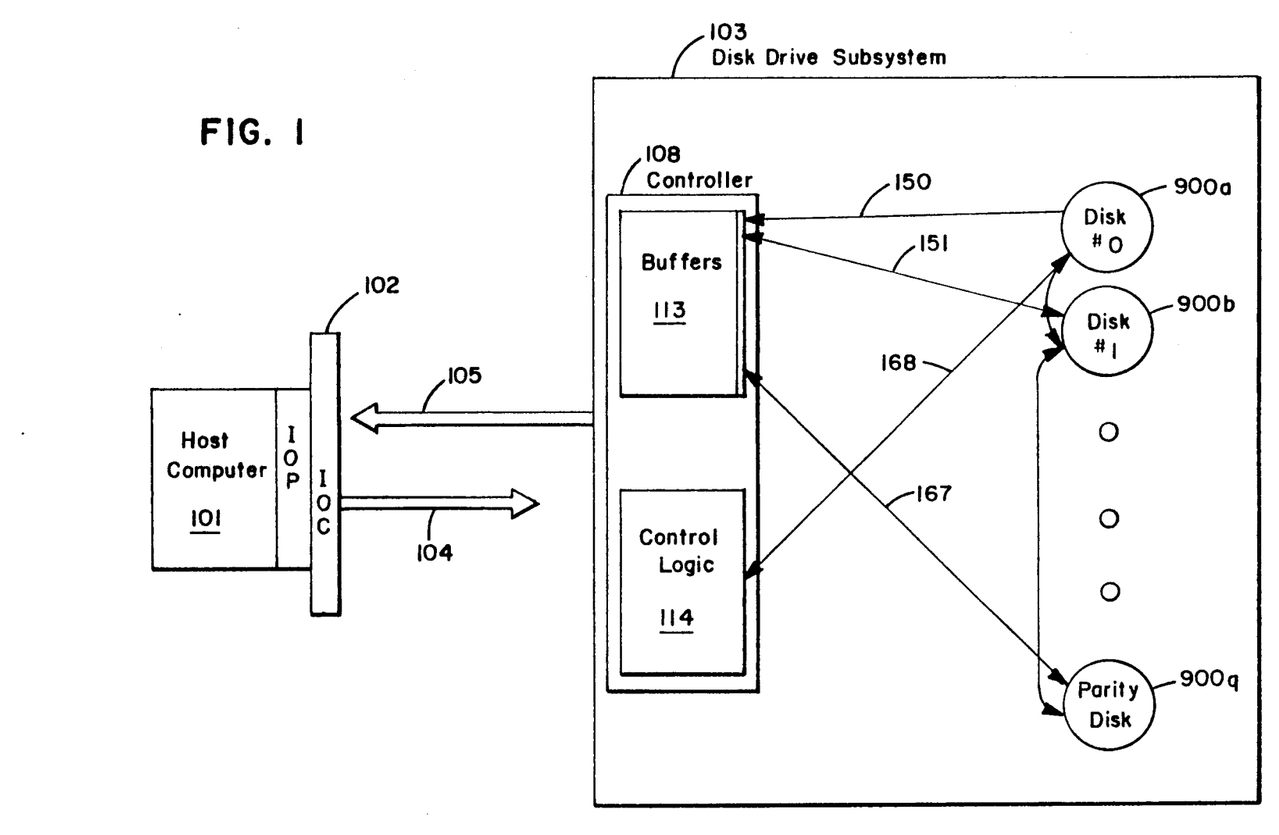
FIG. 1 is a block diagram of the present invention whereby the disk drive subsystem employs a disk array.

Referring to FIG. 1 initially, a host computer 101 communicates with a disk drive sub-system 103 via an input/output channel 102. This communication includes both control information and data to be stored on the disk drive sub-system 103. The data is transmitted in, for example, 16-bit-wide parcels from the host computer 101. Each bit of the 16-bit-wide parcel, plus a parity bit, is stored in a simultaneous, parallel operation on one of 17 standard disk drives $900a$–$900g$ in array 900 This parallel operation, rather than the standard serial operation, results in a storage transfer rate that is 17 times faster than the standard architecture. Those skilled in the art will readily recognized that other size binary words, such as 64 bits, may be transferred as parallel data bits and that a one-to-one correspondence between the number of parallel data bits and the number of disk drives in array 900 is not required.

The disk controller 108 broadcasts control signals to the array of disk drives 900 simultaneously. This controller 108 provides an interface that appears to the host computer 101 as a single disk drive, thereby providing transparent operation and compatability with existing computer systems. The array of disk drives 900 perform the same operations simultaneously because their disk platter stacks (also known as "spindles") are synchronized. This synchronization requires that all disk platters be aligned and that each disk drive reach its index mark at the same time. Those skilled in the art will readily recognize, given the teachings of the present invention, that a greater or lesser number of individual disk drives may be combined to form the array 900.

In the preferred embodiment of the present invention, the interface between the disk drive subsystem 103 and the host computer 101 consists of two cables designated Cable 104 and 105. Each cable consists of 24 signals, described in Table 1.

TABLE 1

| Cable (104) | Cable (105) |
| --- | --- |
| WRITE CLOCK | READ CLOCK |
| FUNCTION READY | STATUS/DATA READY |
| CODE 0-3 | ERROR |
| PARITY (CODE) | DONE |
| BUS OUT 0-15 | READY |
| PARITY (BUS OUT) | INDEX/SECTOR MARK |
|  | PARITY (STATUS) |
|  | BUS IN $_{0-15}$ |
|  | PARITY (BUS IN) |

Signals originating with the host computer 101 are transmitted in Cable 104. Signals originating in the disk drive subsystem 103 are transmitted in Cable 105.

On cable 104 in the preferred embodiment the signal designated WRITE CLOCK is a clock generated by the host computer 101. It synchronizes the transmission of commands and data to the disk drive subsystem 103. The four CODE signals indicate the function to be performed by the disk drive subsystem 103. These function codes are examined and decoded by the disk drive subsystem 103 only when the FUNCTION/DATA READY is active and the PARITY signal indicates there are no errors. The PARITY signal carries an odd parity value for the CODE signals. The signals BUS OUT$_0$ through BUS OUT$_{15}$ form a 16 bit data bus from the host computer 101 to the disk drive subsystem 103.

Each time that the signal WRITE CLOCK is active, and the signal FUNCTION/DATA READY is active, the disk drive subsystem 103 can read 16 bits of data from the BUS OUT $_{0-15}$ signals. The PARITY (BUS OUT) signal transmits the odd parity value for the BUS OUT $_{0-15}$ signals.

On cable 105 of the preferred embodiment, the signal designated READ CLOCK is a clock generated by the disk drive subsystem 103 for the synchronized transfer of status and data signals to the host computer 101. The signal STATUS/DATA READY is set active by the disk drive sub-system 103 when the disk drive subsystem 103 is transmitting data or status information on the BUS IN signals to the host computer 101. The signal STATUS/DATA READY is pulsed active for a single READ CLOCK pulse during write functions to indicate the readiness of the disk drive subsystem 103 to accept the next transfer.

The signal ERROR is set active by the disk drive subsystem 103 in conjunction with the signal DONE to indicate that at least one error condition occurred during the execution of the current function. The signal DONE indicates the completion of command. Signal DONE is set active for only one pulse of the signal READ CLOCK. The signal READY indicates the availability of the disk drive subsystem 103 to accept commands from the host computer 101.

The signal INDEX/SECTOR MARK carries coded index and sector mark information. The signal INDEX/SECTOR MARK is set active by the disk drive subsystem 103 for a single READ CLOCK pulse to indicate a sector mark. Sector mark signals establish rotational reference points along a given track on the disk stack. Each track in the preferred embodiment can contain up to 128 sectors with the initial sector (sector 0) starting coincident with the index point. Sector marks are generated at the end of each physical sector on the track.

The signal INDEX/SECTOR MARK is set active by the disk drive subsystem 103 for two consecutive READ CLOCK pulses to indicate an index mark. The index mark is a status indicator that, when active, indicates that the reference point or index area is passing under the head. The index point is a pulse which occurs once per revolution of the disk stack. The index point is used to reset the timing circuits once each revolution. The index mark is generated at the beginning of sector 0.

In the preferred embodiment, the signal PARITY (STATUS) carries the odd parity value for the combination of signals STATUS/DATA READY, ERROR, DONE and READY. This parity value can be examined whenever the signal READY is set active by the disk drive subsystem 103.

The signals BUS IN$_0$ through BUS IN$_{15}$ form a 16 bit data bus that transmits information from the disk drive subsystem 103 to the host computer 101. The signal PARITY (BUS IN) carries in the preferred embodiment the odd parity value for the signals BUS IN$_0$ through BUS IN$_{15}$ during the READ CLOCK pulses where the signal READY is active.

The commands generated by the host computer 101 include SELECT, READ, WRITE, HEAD SELECT, CYLINDER SELECT, DATA TRANSFER, other commands, and diagnostics. These commands are identified by a specific combination of active and inactive CODE signals. Recognition of a command by the disk drive subsystem 103 requires an active signal FUNCTION/DATA READY and a valid signal PARITY (STATUS) during a WRITE CLOCK pulse.

When the host computer 101 wants to transfer data in or out of the disk drive subsystem 103, the first command generated by the host computer 101 will be the command SELECT. If the binary value transmitted by the BUS OUT signals during a SELECT command matches the logical unit number of the disk drive subsystem 103, the disk drive subsystem 103 recognizes that the host computer 101 wishes to converse with it.

Figure 2:
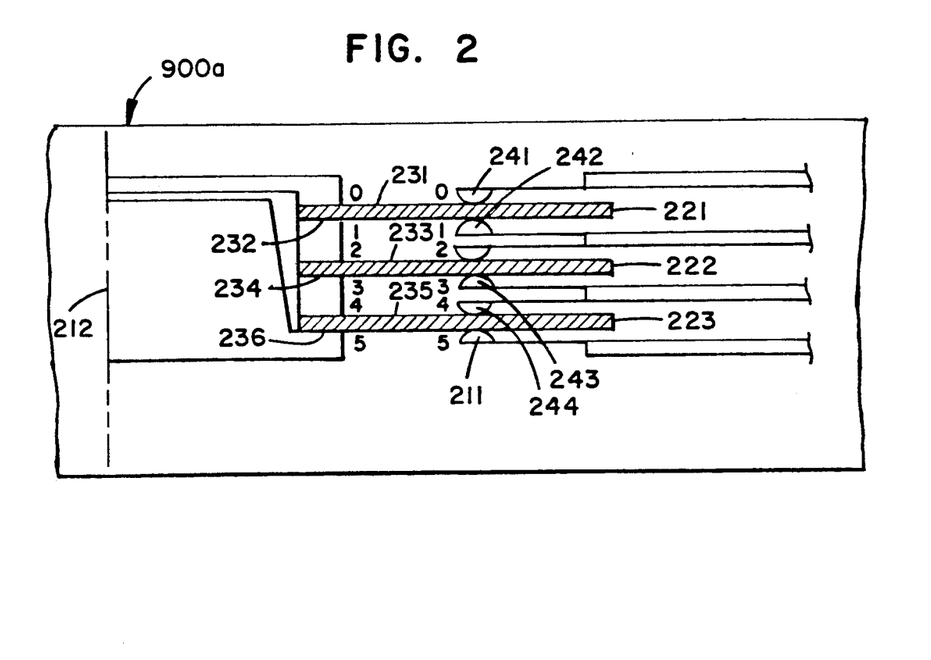
FIG. 2 is a typical disk platter stack used for storing information.

After the disk drive sub-system 103 has been selected by the host computer 101, the next series of commands will indicate the head and track to use during the READ or WRITE operation. The command HEAD SELECT specifies the head group to use for those disk drive subsystems that support multiple Read/Write heads on a single disk platter stack. Note that this embodiment assumes each individual disk in the disk 900 is identical to the others. Therefore, this embodiment will support multiple head drives and the HEAD SELECT command only if all drives are multiple head drives. FIG. 2 depicts a disk platter stack with multiple Read/Write heads. The signals BUS $OUT_8$ through BUS $OUT_{10}$ indicate which head group to use. The command CYLINDER SELECT identifies which track to use. Those skilled in the art will readily recognize that single head or single platter disk drives could be substituted for the multiple platter, multiple head disk drives 900.

The interface protocol between the host computer and the disk drive controller 108 in the preferred embodiment of the present invention could be of the type described in my co-pending patent application U.S. Ser. No. 622,066 entitled "Electrical Interface System" and assigned to the assignee of the present invention. Those skilled in the art will readily recognize other interface systems which could be used.

The READ command initiates the transfer of information from the disk drive subsystem 103 to the host computer 101. The BUS OUT signals are used to indicate parameters to the READ command. The signals BUS $OUT_0$ through BUS $OUT_7$ are used to identify which sector is desired. The signals BUS $OUT_8$ through BUS $OUT_{10}$ are used to indicate which head to select following the execution of the current READ command on those disk drive subsystems that support multiple Read/Write heads on a single disk platter stack. The signals BUS $OUT_{12}$ through BUS $OUT_{14}$ indicate a "read option" as follows:

(1) Verify sector ID and read the data portion of the sector;
(2) Read the sector ID;
(3) Read sector data only;
(4) Read the current contents of controller memory;
(5) Read the sector ECC (ERROR CORRECTION CODE) information.

The READ command is indicated by a specific CODE combination and an active FUNCTION/READY signal. The READ command is the implied request for a first data packet comprised of 16 words serially transmitted, each word being 16 bits of parallel data (termed a 16×16 packet). If an error is detected in the beginning phase of the READ process (e.g., reading the sector ID, comparing the ID, verifying that the sector is not flawed, etc.) then a DONE signal and the ERROR signal is returned. If no error is detected, then the first data packet is returned. In order to continue the READ process, FUNCTION/READY is activated along with the specific CODE combination for "DATA" during a single WRITE CLOCK period. This process is repeated 128 times to read a 4096 byte data sector. When all the data has been transferred, the disk drive subsystem 103 responds with an active DONE signal and the ERROR signal if asserted.

The 16×16 packet approach is preferred due to its higher transmission efficiency since a minimum amount of handshaking protocol is required for transmitting the digital data. For each request, 16 words of 16-bit data is transmitted in a packet to provide a highly efficient disk channel protocol. This packet transfer technique is described in U.S. Pat. application Ser. No. 644,066 of Robert James Halford entitled "Electrical Interface System", assigned to the assignee of the present invention.

The WRITE command transfers information from the host computer 101 to the disk drive subsystem 103. The BUS OUT signals indicate specific parameters to the WRITE command. The signals BUS $OUT_0$ through BUS $OUT_7$ indicate the specific sector where the data is to be written. The signals BUS $OUT_8$ through BUS $OUT_{10}$ indicate the head which is to be selected following execution of the current WRITE command for those disk drive subsystems that support multiple Read/Write heads on a single disk platter stack. The signals BUS $OUT_{12}$ through BUS $OUT_{14}$ indicate the write options as follows:

(1) Verify the section ID and write the data portion of the sector;
(2) Write the sector ID;
(3) Write a defective sector ID;
(4) Write data only to the controller memory;
(5) Write the data with a zero ECC block.

The WRITE command is indicated by a specific CODE combination and an active FUNCTION/READY signal. The WRITE command is the implied request for the first data packet (16×16 bits). If an error is detected in the beginning phases of the WRITE process (e.g., ID field, ID field compare, etc.), then a DONE signal and the ERROR signal is returned. If no error is detected, then the first data packet is transferred. To continue the WRITE process, FUNCTION/READY is activated along with the specific CODE for "DATA" for 16 WRITE CLOCK periods. This process is repeated 128 times to write a 4096 byte data sector. When all the data has been transferred, the disk drive subsystem 103 responds with an active DONE signal and the ERROR signal, if asserted.

Disk controllers generally provide a means for synchronizing the data transfers between a host computer and a disk drive. In this preferred embodiment, the disk drive subsystem 103 contains a controller 108 which includes a buffer memory 113 so that it can temporarily store data, thus giving the host computer 101 or disk drive subsystem 103 more time to respond. Additionally, data transfer instructions may include the number of bits to be transferred and the controller 108 may be used to keep track. In the preferred embodiment one level of buffering is provided in the input/output channel 102 and two levels of buffering are provided within the controller 108.

Figure 3:
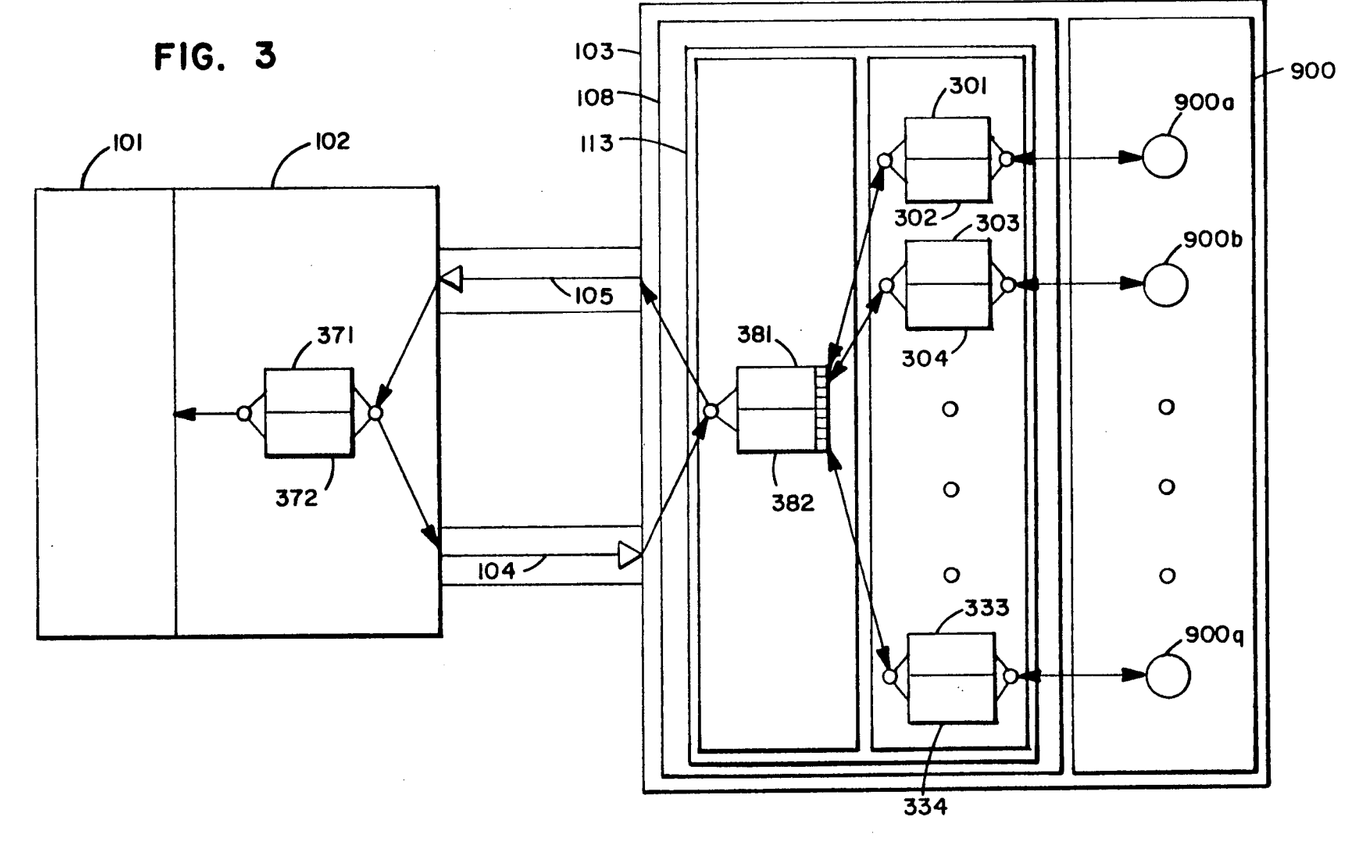
FIG. 3 is a block diagram of the present invention illustrating the buffering operations used to synchronize the data transfers between the host computer and the disk drive subsystem.

Referring now to FIG. 3, in the preferred embodiment of the present invention the host computer 101 can transfer data at a rate of 850 MBits/sec. However, an individual disk drive, for example drive 900a within the disk array 900 can only store or retrieve data at a rate of 10 to 24 Mbits/sec. Therefore, the input/output channel 102 and the controller 108 perform buffering and synchronization functions using a speed matching technique.

The input/output channel 102 provides for dual speed matching buffers 371 and 371. Using dual buffers 371 and 372, the channel 102 will transfer data into buffer 371 first, then when buffer 371 is full it will switch to buffer 372 and continue transferring data into it. While data is being transferred into the buffer 372, data can be transferred out of buffer 371 and transmitted to the disk controller buffers 113. By using the speed matching technique, the transfer of data from the 850 Mbits/sec interface to the multiple 10 to 24 Mbits/sec individual disk interfaces is easily attained.

Each data transfer between the channel 102 and the disk controller buffers 113 will use the buffer locations 381 and 382. Each transfer into buffer 381 or 382 transmits 16 bits of data. A parity check is performed at that time and the 16 data bits plus the parity bit are stored in the speed matching buffers 381 and 382. The data stored in buffers 381 and 382 is then transmitted serially to one of seventeen dual speed matching buffers 301 through 334. When transferring data to these dual speed matching buffers, each bit of the 16 bit parcel and single bit parity value is routed to a particular pair of speed matching buffers depending on its position within the parcel.

To illustrate, seventeen bits are transferred out of buffer 381. Each bit is routed along a data path associated with a unique pair of speed matching buffers and an individual disk drive. Bits are routed in the following manner: bit position 0 will be routed along the data path associated with speed matching buffers 301-302 and disk drive 900a; bit position 1 will be routed along the data path associated with speed matching buffers 303-304 and disk drive 900b; etc.

Conversely, when data is transferred from an individual disk drive and into the speed matching buffers, the process is reversed. Each bit retrieved from a disk drive is then stored in a unique pair of speed matching buffers. The transfer from buffers 301 through 334 into 381 or 382 combines the bits into a 16 bit parcel, plus parity bit, that is ordered in the following manner: the bit retrieved from disk drive 900a will provide the bit for position 0; the bit retrieved from disk drive 900b will provide the bit for position 1, etc.

This embodiment provides a storage capacity equal to 17 times the storage capacity of an individual disk drive because there are seventeen parallel disk drives operating in unison. Although an individual disk drive has a data transfer rate of 10-24 Mbits/sec., this embodiment provides an overall data transfer rate of 170-408 Mbits/sec. or 17 times the transfer rate of an individual disk drive 16 out of the 17 disk drives store data, the 17th disk drive stores the parity bit for error detection purposes and therefore, to the user, the effective data transfer rate is 160-384 Mbits/sec.). The seek rate, or the time required to address a particular track, for this invention is equal to the seek rate of an individual disk drive. Because this embodiment uses synchronous spindles, the latency period is equal to the average case for an individual disk drive.

Figure 4:
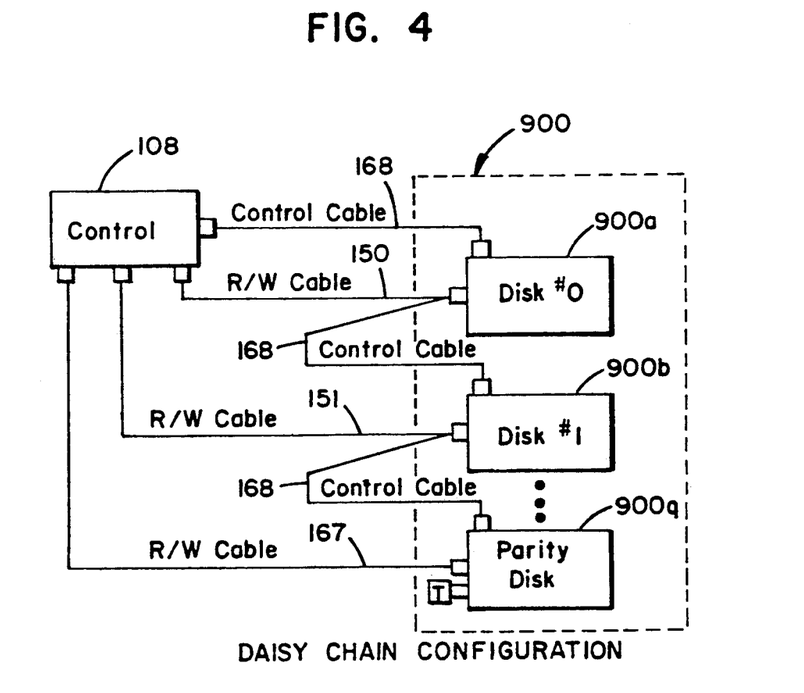
FIG. 4 is a block diagram of the present invention that illustrates the connections for control and data cables between the disk controller and each individual disk drive in the disk array.

Referring to FIG. 4, two cables connect the common disk controller 108 to each individual disk drive: a Control cable 168 and multiple Read/Write cables 150 through 167. In the preferred embodiment of the preferred invention, the disk drives are "daisy chained" on the Control cable 168 although this technique is not essential. Each individual disk drive requires a direct connection to the disk controller for the Read/Write cable.

The Control cable 168 contains $BUS_0$ through $BUS_9$ signals, $TAG_0$ through $TAG_2$ signals, $STATUS_0$ through $STATUS_8$ signals, the OPEN CABLE signal, the SELECT ENABLE signal, UNIT $SELECT_0$ through UNIT $SELECT_3$ signals, and the SERVO CLOCK signal. The Read/Write cable contains the signals READ CLOCK, READ DATA, WRITE CLOCK, WRITE DATA, UNIT SELECTED, and SEEK END.

When the signal DEVICE ENABLE is active, drive selection and operation are allowed. The disk controller 108 will respond with SELECT ENABLE. Each disk drive compares its manually set address with the value indicated by the UNIT SELECT signals. If the values match, the selected disk drive recognizes that the disk controller wishes to converse with it. In this embodiment, all disk drives are set with the same address. Therefore, all of the disk drives respond simultaneously and in parallel to the same UNIT SELECT signal.

The TAG signals indicate the type of function to be performed. Again, all disk drives in array 900 will respond simultaneously and in parallel. $TAG_0$ tells the disk drive to move its Read/Write head to the location indicated by the address represented by the signals $BUS_0$ through $BUS_9$. The signal SEEK END indicates that the Read/Write head is stationary, that it is positioned over a track, and that it is ready to perform the next data transfer operation. $TAG_1$ indicates which Read/Write head to use on the data transfer operation. The head group will be indicated by the signals on $BUS_0$ through $BUS_3$. The signal $TAG_2$ indicates that the signals respresented by $BUS_0$ through $BUS_9$ should be interpreted by the disk drive as a function code such as READ, WRITE or some other command.

When control signal $TAG_2$ indicates a function, then an active $BUS_0$ signal indicates a WRITE operation. The WRITE CLOCK signal provides the timing pulse for the WRITE DATA line. Data is transmitted to the disk drive on the WRITE DATA line. The $BUS_0$ indicator will cause the disk drive to enable its write circuitry to convert the data on the WRITE DATA line to current reversals in the Read/Write head, thereby recording information on a selected track on the disk stack.

When control signal $TAG_2$ indicates a function, The READ CLOCK signal provides the timing pulse for the signal READ DATA. Data is transmitted to the controller on the READ DATA line. The $BUS_1$ indicator will cause the disk drive to enable its read circuitry to convert the analog information recorded on a given track to digitized data which is transmitted through the READ DATA line back to the disk controller.

When control signal $TAG_2$ indicates a function then an active $BUS_6$ signal indicates a REZERO operation. This indicator will cause the disk drive head positioner to reposition to cylinder O.

Figure 5:
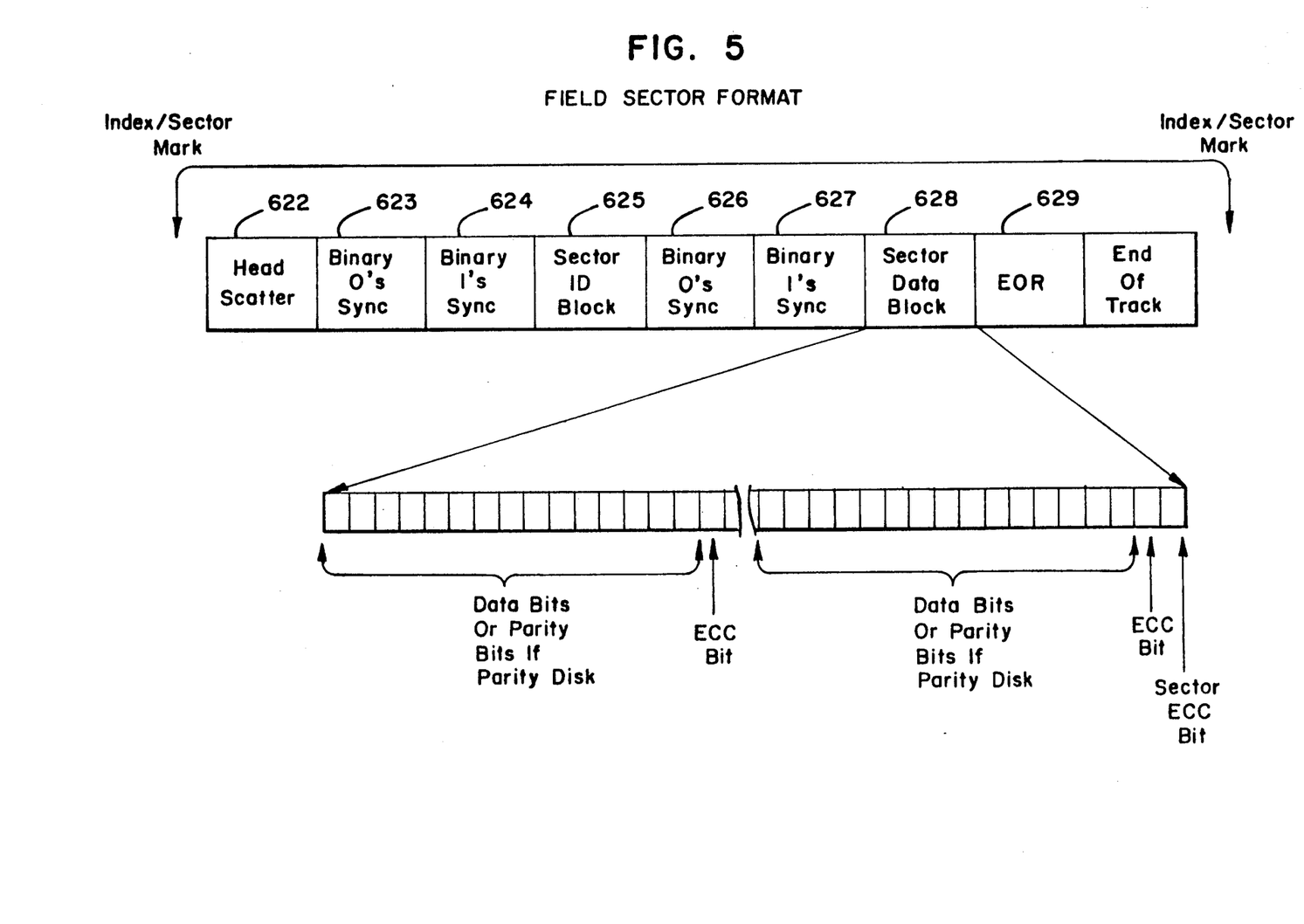
FIG. 5 illustrates the format of a sector on an individual disk drive of the present invention.

Referring now to FIG. 5, the record format on the disk is under the control of the disk controller. The index and sector mark pulses are available for use by the controller to indicate the beginning of a track or sector. The preferred sector format is shown in FIG. 5. Those skilled in the art will readily recognize that other formats could be used.

The field HEAD SCATTER 622 provides some tolerance for head skew. The field HEAD SCATTER 622 consists of binary 0's. The field BINARY 0's SYNC 623 consists of multiple binary 0's used to provide phase locked oscillator synchronization and some tolerance for timing. The field BINARY 1's SYNC 624 consists of one or more binary 1's used to indicate the beginning of either the sector ID 625 or the sector data 628. The field EOR 629 (End of Record Tolerance) is a 8 bit pad of binary 0's which prevents the possible destruction of the end of a sector by an out of skew Read/Write head attempting to address the following sector.

To execute a WRITE command, the following steps occur in the preferred embodiment. First, as mentioned earlier, the desired unit is selected and the track, head, and sector are addressed. The disk controller 108 searches for the leading edge of the desired sector. The sector ID field 625 must always be read and verified prior to writing the sector data field 628. The sector data field 628 must always be preceded by the BINARY 0's SYNC 626 and BINARY 1's SYNC 627 fields. BINARY 0's SYNC 626 also includes a HEAD SCATTER portion similar in operation to HEAD SCATTER 622, providing tolerance for head skew. The sector data field 628 must always be followed by the EOR pad 629.

Spindle synchronization is accomplished in the preferred embodiment by developing an external clock within the disk controller 108. This external clock provides a master pulse-once per revolution time with possible extra pulses each N microsecond. The MASTER CLOCK signal provides the disk controller with a method for synchronizing the WRITE DATA line with the actual speed of the disk platters. In this embodiment, one MASTER CLOCK signal will be broadcast to all individual disk drives to force the spindle synchronization.

Spindle synchronization has been known in the prior art, and the means for synchronizing spindles of a plurality of disk drives is capable on certain models of Ampex disk drives. For example, Ampex model No. 9397 14-inch disk drives use a synchronizing pin to synchronize the AC motors controlling the spindles. This synchronization function was used for video instant replay for digitized images. The 14-inch disk drives were synchronized to +4 microseconds skew by providing an external clock driving the synchronization pin of each drive. The sector zero marks of each platen were then synchronized with 4-microsecond skew. For the present invention to operate properly, skew must be kept below +10 microseconds for synchronized drives. The lower the skew the higher the data packing capacity of the present invention.

The synchronization of spindles must occur at a very fine level. The disk platter typically rotates at a speed of 3600 rpm. This results in one revolution every 0.0166 seconds. If there are 64 sectors per track, then the sector time (the period that the sector is under the Read/Write head) is 0.0166 divided by 64 or 0.000260 seconds. As stated earlier there are leading binary 0's in the BINARY 0's SYNC field that is inserted just before sector ID block or the sector data block. If the spindles can be synchronized to a tolerance of plus or minus 12.5 microseconds (0.0000125 seconds) and the sector time is 260 microseconds (0.000260 seconds), then at least 25 microseconds or 10% of the sector space must be given up to the BINARY 0's SYNC field to ensure that all disk drives begin reading information from the same sector on the same track at the same time.

Actually, in the real world, if the tolerance is N microseconds, then it is more realistic to use $5 \times N$ micro seconds to insure spindle synchronization. The level of spindle synchronization is important. For example, if the spindles can be synchronized only to a tolerance of plus or minus 80 microseconds, then the BINARY 0's SYNC field would require 33% of the sector space (for 64 sectors per track). Of course, the present invention would still work. The optimal synchronization factor for this approach should be near one microsecond.

Figure 6:
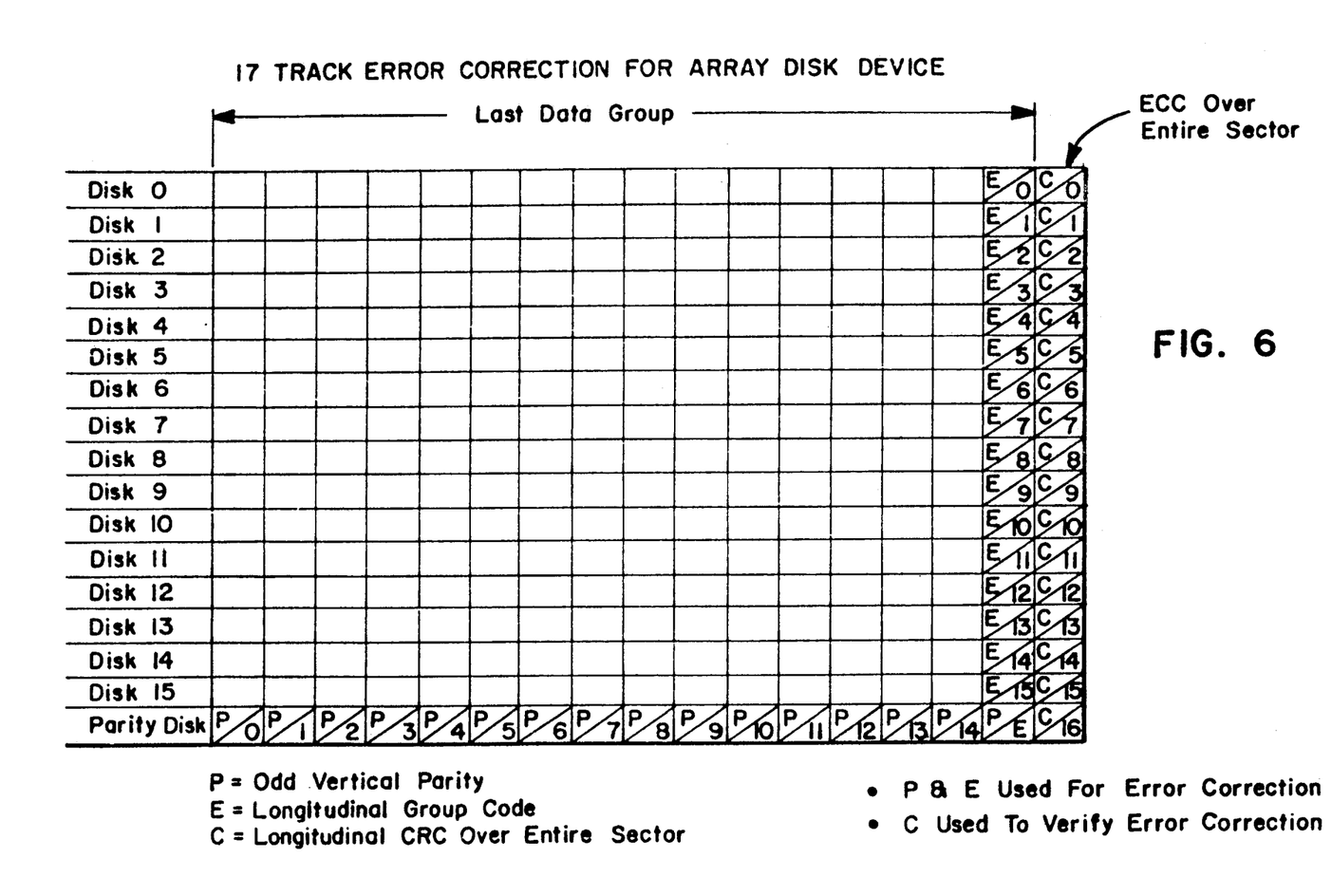
FIG. 6 shows the logical grouping of data on the disk array and its error detection and correction means.

Referring now to FIG. 6, which describes logically how data is stored on the parallel disk drives in the array 900. Each row (horizontal) represents bits stored on a single sector on a single track on a single disk drive. Each column (vertical) represents a 16 bit word transferred by the host computer 100. Each bit is stored on a different disk drive. The parity bit on the seventeenth disk drive was generated by the disk controller for error detection purposes. The data is logically grouped in 15 word segments. Each 15 word segment includes error detection and correction means labeled in FIG. 6 as bits $E_0$ through $E_{15}$ Each sector includes an additional word for redundant error correction and detection labeled in FIG. 6 as bits $C_0$ through $C_{15}$.

Using this storage method and using error detection and correction circuits for manipulating the Error Correction Code (ECC) bits $E_0$-$E_{15}$ in the disk controller, any track in error can be corrected for any 15 word segment. In FIG. 6, bits $P_0$ through $P_{15}$ are "vertical" parity bits. They contain the odd parity value for the column of bits. The bits labelled $E_0$ through $E_{15}$ in FIG. 6 are members of the Error Correction Code (ECC) value for the block. The combination of ECC and parity check bits enables the identification and correction of all failing bits on any single disk drive within a 15 word segment. The row, or disk drive, in error can change every sixteen bits for the case of randomly detected unflawed media defects. As an additional check, an ECC is generated over the entire sector and stored as a vertical "word" immediately following the last group in the sector. This ECC will verify that the sector was repaired correctly.

Thus, a plurality of single disk drives, synchronized and controlled to emulate the operation of a single disk drive, is a cost-effective means of providing high-performance, high-capacity disk storage devices. Another benefit of the present invention is the reliability and cost-effectiveness of using just one disk controller to manage a plurality of disk drives. Yet another benefit is that the number of cables connecting the host computer with the disk storage device is reduced with regards to the number of disk drives communicating with the host computer. A high degree of fault tolerance is provided through the use of parity bits and sector ECC parcels such that one disk drive within the array can fail without interrupting the operation of data storage and retrieval.

While the present invention has been described in connection with the preferred embodiment thereof, it will be understood that many modifications will be readily apparent to those of ordinary skill in the art, and this application is intended to cover any adaptions or variations thereof. Therefore, it is manifestly intended that this invention be limited only by the claims and the equivalents thereof.

What is claimed is:

1. A high speed disk array for emulating the operation of a single disk drive, comprising:

a data input/output interface means for connecting to a computer for receiving/transmitting digital data, said input/output interface comprising a first speed matching buffer coupled to a bidirectional data bus;

a plurality of disk storage devices, each having spindles synchronized with each other by a master clock signal that is broadcast to each of said plurality of disk storage devices;

a common controller connected to said interface means and connected for controlling each of said disk storage device for performing the steps of:
 (a) receiving said digital data from said data interface means;
 (b) dividing said digital data into subparts;
 (c) assigning error detection codes to said subparts;
 (d) formatting said subparts into a plurality of fixed sector format subparts; and
 (e) simultaneously writing each fixed sector format subpart to one of said plurality of disk storage devices;

said common controller comprising:
 (a) a second speed matching buffer coupled to said bidirectional data bus; and
 (b) a plurality of third speed matching buffers coupled one each to said plurality of disk storage devices; and said plurality of disk storage devices coupled together in a daisy chain configuration wherein said disk storage devices are coupled together by a plurality of control cables in a continuous unbroken chain, one and only one of said plurality of disk storage devices further coupled to said common controller by another control cable.

2. The disk array according to claim 1 wherein said common controller is further operable for performing the steps of:
 (f) simultaneously reading each fixed sector format subpart from each of said plurality of disk storage devices;
 (g) unformatting said subparts from each fixed sector format subpart;
 (h) reassembling said digital data from said unformatted subparts; and
 (i) transmitting said reconstructed digital data to said data interface.

* * * * *

UNITED STATES PATENT AND TRADEMARK OFFICE
CERTIFICATE OF CORRECTION

PATENT NO.  : 5,128,810
DATED       : July 7, 1992
INVENTOR(S) : Robert J. Halford It is certified that error appears in the above-identified patent and that said Letters Patent is hereby corrected as shown below:

In column 6, line 14, delete "application" and insert --Application-- therefor.

In column 7, line 6, delete "371" and insert --372-- therefor.

In column 7, line 55, insert --(-- after the word "drive" therefor.

In column 8, line 50, insert --then an active $Bus_1$ signal indicates a READ operation.-- after the word "function" therefor.

In column 9, line 45, delete "+4" and insert --±4-- therefor.

In column 9, line 50, delete "+10" and insert --±10-- therefor.

In column 10, line 62, delete "adaptions" and insert --adaptations-- therefor.

UNITED STATES PATENT AND TRADEMARK OFFICE
CERTIFICATE OF CORRECTION

PATENT NO. : 5,128,810
DATED : July 7, 1992
INVENTOR(S) : Robert J. Halford

It is certified that error appears in the above-identified patent and that said Letters Patent is hereby corrected as shown below:

In column 11, line 11, claim 1, delete "device" and insert --devices-- therefor.

Signed and Sealed this

Second Day of November, 1993

Attest:

BRUCE LEHMAN

*Attesting Officer*      *Commissioner of Patents and Trademarks*